United States Patent [19]
Clayton et al.

[11] 3,984,047
[45] Oct. 5, 1976

[54] REINFORCED THIN WALL PLASTIC BAG

[75] Inventors: William J. Clayton, Fairport; Robert H. Olson, Pittsford; Donald Kutniewski, Macedon, all of N.Y.

[73] Assignee: Mobil Oil Corporation, New York, N.Y.

[22] Filed: Oct. 15, 1973

[21] Appl. No.: 406,423

Related U.S. Application Data

[63] Continuation-in-part of Ser. No. 383,027, July 26, 1973, abandoned.

[52] U.S. Cl. .................................... 229/55; 229/53; 229/3.5 R
[51] Int. Cl.² .................. B65D 33/02; B65D 31/00
[58] Field of Search ..................... 229/53, 55, 3.5 R; 224/177; 161/121, 123

[56] References Cited
UNITED STATES PATENTS

| | | | |
|---|---|---|---|
| 686,877 | 11/1901 | Arkell | 229/55 |
| 2,750,631 | 6/1956 | Johnson | 264/177 R X |

*Primary Examiner*—George E. Lowrance
*Assistant Examiner*—Douglas B. Farrow
*Attorney, Agent, or Firm*—Charles A. Huggett; James D. Tierney

[57] ABSTRACT

A plastic bag such as trash can liners, grass and leaf bags, sandwich bags and the like is reinforced by placing spaced ribs therein, integral with the wall structure, the ribs having a rib-to-rib spacing in the order of ⅛ to 2 cm, the ribs being peaked and merging smoothly from a projecting peak to the thickness of the walls between the ribs, the peaks extending about 1.5 to 10 times the wall thickness of the film which is, preferably, in the order of about 0.4 to 2.0 mils. Upon extrusion, the extrusion die is formed with small notches with rounded corners so that the ribs are extruded while the film material is extruded, and provide additional material in the region of the ribs which merges smoothly with the material being extruded to form the film. Such rib-reinforced bag structures may be produced by forming a continuous roll of such bags, the individual bags in such a roll being readily separated along predetermined lines of weakness.

12 Claims, 9 Drawing Figures

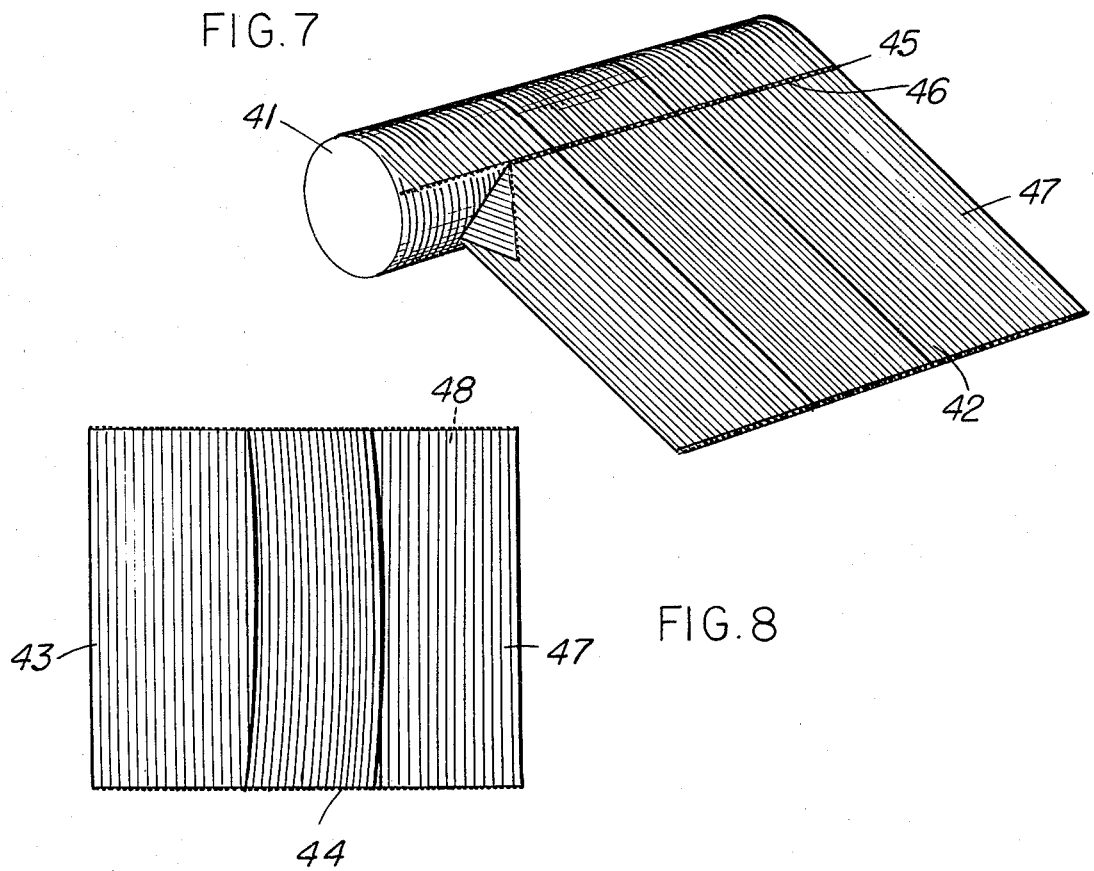
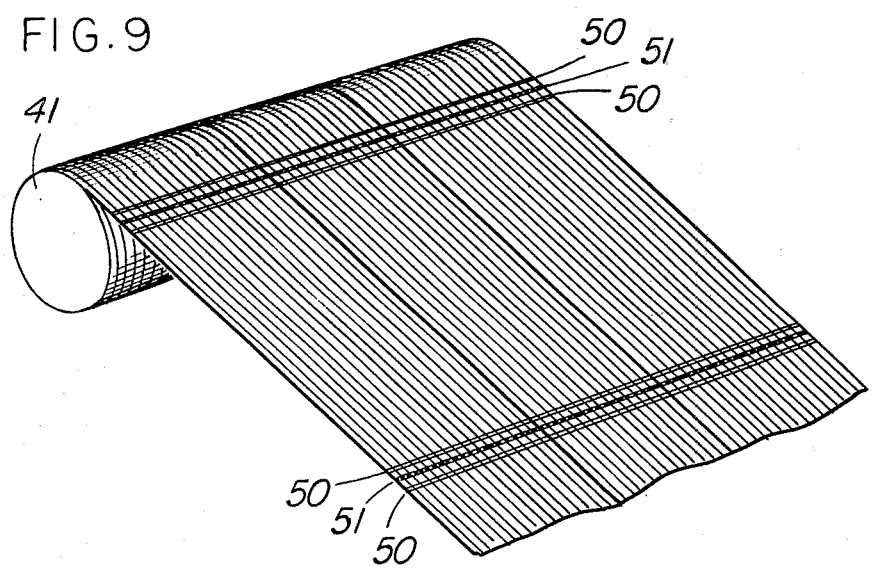

REINFORCED THIN WALL PLASTIC BAG

CROSS-REFERENCE TO RELATED APPLICATIONS

The present application is a continuation-in-part of U.S. application Ser. No. 383,027 filed July 26, 1973, now abandoned.

FIELD OF THE INVENTION

Plastic bags, particularly disposable plastic bags such as liners for containers, trash cans, leaf bags, sandwich bags, and the like capable of holding moderate loads in the order of about 5–20 kg, and made of thin polyethylene film, are widely used and have become increasingly popular. Such bags have the advantage that they are highly resistant to vermin, can be left exposed to the weather when filled, and provide a convenient and inexpensive way of disposing of unwanted trash, or of temporarily storing bulky material, such as leaves, grass clippings, and the like. The present invention is directed to an improvement in such bags.

BACKGROUND OF THE INVENTION

Disposable plastic bags, particularly when made of thin polyethylene film having a wall thickness in the order of about 0.4 to about 2 mils, when overloaded, have a tendency to burst; if punctured, they also have a tendency to rip, the rip extending at random, and uncontrollably, and rapidly extending throughout the film of the bag. Puncture may occur for example by sharp object placed in the bag, cuttings of tin cans, nails, glass splinters or the like; even a comparatively small puncture which is small enough to prevent escape of the contents of the bag themselves may, when only slightly stressed (for example upon picking up of the bag) result in an uncontrollable and rapidly extending rip, resulting in spillage of the contents. Doubling the bag is no solution, and increasing the wall thickness of the bag rapidly increases the shipping weight of the material, and the costs. The costs for such bags should be kept as low as possible, and the amount of material to be used should be a minimum, consistent with the expected usage, in view of the fact that they are considered to be disposable and may be incinerated.

It is an object of the present invention to improve bags of this type by providing a reinforcement in the bag structure without, however, utilizing additional materials, or markedly increasing the cost of manufacture.

It is known that the strength of materials can be increased by forming ribs thereon; ribbed plastic material, as such, has been proposed previously and U.S. Pat. No. 2,750,631 sets forth, in general, a method of manufacturing ribbed sheet plastic. This patent is related, essentially, to an extrusion apparatus which is modified to provide sheet plastic material which has ribs thereon, essentially of square configuration.

SUBJECT MATTER OF THE PRESENT INVENTION

Briefly, the bag is made of a film of limp, low density polyethylene material, having a wall thickness in the order of about 0.4 to about 2 mils., with spaced, peaked ribs integral with the film formed therein. The rib-to-rib spacing is in the order of ⅛ cm to 2 cm. preferably about ½ cm, up to about 1 cm. The ribs merge smoothly from the projecting peak to the thickness of a wall between the ribs, the overall extent of the ribs being preferably about 1.5 to 10 times the wall thickness of the film, for example in the order of about 0.1 mm, or even less.

In accordance with the feature of the invention, the bags are made from extruded sheet material, made on apparatus utilizing the well known inflated bubble method to reduce extruded sheets to a desired wall thickness. The extrusion apparatus has an extrusion head in which an outer, annular extrusion die surrounds a mandrel located centrally of the die. Either the die or the mandrel may be formed with radially extending, peaked notches which have smoothly rounded corners at their intersection with the annular extrusion surface of the die or mandrel, respectively, to form the ribs upon introduction of flowable polyethylene material between the annular die and the mandrel. The internal peaking of the notches provides the peaked ribs, and the smoothly rounded contour of the notches, as they merge into the die surface provides ribs with smoothly rounded contours extending towards the sheet material. The gap between the mandrel and the extrusion die is substantially wider than the thickness of the wall of the film. The depths of the notches, however, is not of the same ratio of depths as the ratio of gap widths to wall thickness; rather, the depths of the notches is substantially less. In other words, the reduction of thickness during blowing of the walls from the gap widths to wall widths is greater than the reduction of thickness, upon blowing, of the ridges from notch depths to the overall ridge dimension.

In accordance with another feature of the invention, the method of extrusion comprises extruding flowable polyethylene through a gap formed between the extrusion die and the mandrel, with the notches formed in either the die or the mandrel (preferably in the die). The polyethylene material, so extruded, is inflated in accordance with well known processes, and uniformly cooled. The portions of the film between the ribs, formed by the notches in the extrusion die or mandrel, respectively, will cool first and provide a film which hardens, while the region of the ribs, which is thicker, is still plastic, continued cooling providing for a smooth transition of hardening of the walls between the ribs, until the ribs themselves have hardened. Due to the differential hardening of the material (taken across any section of the inflated sheet, after it has left the extrusion die), a slight inner rib will also be formed opposite the rib which is actually due to the increased material being extruded where the notches are placed in the extrusion die, or mandrel, respectively.

The blow-up ratio during extrusion is quite important, and it has been found that a higher blow-up ratio than that customarily used for similar sheet material, without ribs, results in a stronger bag. Also, the distances between ribs, as well as the thicknesses of the ribs are somewhat critical, in order to prevent weakening of the material intermediate the ribs. If the quantity of material used, for example for each linear meter of material, is the same for ribbed as for non-ribbed webs, it is evident that the thickness of the material between ribs will be less than that in non-ribbed material, in order to permit the accumulation of material beneath the ribs. Although the web material, between the ribs, will be somewhat thinner, the overall strength of the bag is not impaired and the random tear resistance is enhanced. The conditions which are important to be matched to each other, so that the ribbed structure can be made with its improved tear resistance, without additional use of material, are:

a. Thickness of the ribs, that is, overall extent of the ribs, transverse of the thickness of the sheet; this should be about 0.1 mm, or slightly less. If substantially less, for example 0.05 mm, then the ribs will not be thick enough; if thicker, that is, for example 0.5 mm, additional material will be necessary which increases the total amount of material used without, however, substantially enhancing the utility or strength of the bag.

b. Distance between ribs: This should be about ⅛ cm to 2 cm. It has been found from actual experience that about ½ cm is the best distance between ribs, although there is very little change in characteristics of the bag if the ribs are spaced about 1 cm apart. As the spacing increases beyond 1 cm, the effect of the ribs becomes less.

c. Slope of the ridges: The slope of the ridge from the peak of a rib to the normal wall thickness has an effect on the overall strength. If the slope is too steep, or if the ridge is not clearly peaked but almost square on top, or trapeze-shaped, a weak point results at the junction between the rib and the web thickness. This can be compared to the well known notch effect, which should be avoided, since weakness is introduced at the junction between the rib thickness and the rest of the web material, unless there is a smooth transition. This smooth transition could be compared to the fillet in a welded structure. In order to provide smooth transition, the die through which the material is extruded, at the side where the ridges are to be formed, should have smoothly rounded edges which smoothly merge into the circumference of the remainder of the die surface.

d. Low point between ridges: The average thickness of the web should be as uniform as possible and an undercut adjacent the formation of the rib, with respect to the remainder of the web or film thickness should be avoided. The film thickness should be maintained as uniform as possible. Low points, or undercuts may result if the slope of the peaks (above condition) is selected to be too steep. For ridges of an overall thickness of about 0.1 mm, a width of thicker material (measured between the regions where the normal wall thickness obtains) of about 0.6 mm (25 mils) is suitable.

The material itself is not critical, and since its eventual destination is to be discarded, it will be used only for short periods of time, and its ultimate fate will be that it will be discarded. The quality of the material can range within wide limits and the actual composition, and characteristics need not be critically controlled. A suitable material is conventional liner grade low density polyethylene, that is, polyethylene having a density within about 0.9 to 0.925. The melt index of the material is likewise variable within a rather wide range, and may be in the range of from 0.2 to 6, although a melt index at the lower end of the range is preferred, that is, preferably less than 3, for example about 0.3 to about 1.

The direction in which the ribs are placed with respect to the bag, as eventually manufactured, will depend upon whether the material is slit and the bag made from flat slitted extruded material, or from tubular material, and whether the bag is seamed at the bottom, or at the sides. The ribs, therefore, may extend longitudinally of the bag, or transversely, depending upon the cutting in the manufacture of the bag. The ribs may also extend at other directions although, from a cutting point of view, ribs which have a vectorial direction extending longitudinally of the bag are easier to assemble from slit sheet material. The bags can be made from the ribbed sheet material on conventional bag making machinery. The thickness of the ribs does not interfere with the cutting and heat sealing of the seams being made by the bag making machinery to which ribbed material, extruded as above set forth, is supplied

BRIEF DESCRIPTION OF DRAWINGS

Advantages of the invention will become apparent to those skilled in the art from the following description considered in conjunction with the drawings, wherein:

FIG. 7 is a perspective view of a specific type of bag structures on a roll with which the rib configuration of the present invention may be employed.

FIG. 8 is a view of a single bag structure after it has been removed from the continuous roll or bags shown in FIG. 7.

FIG. 9 is a perspective view of a roll of bag structures, similar to those of FIG. 7, but which are joined together in a fashion different from that illustrated in FIG. 7.

DETAILED DESCRIPTION

Figure 1:
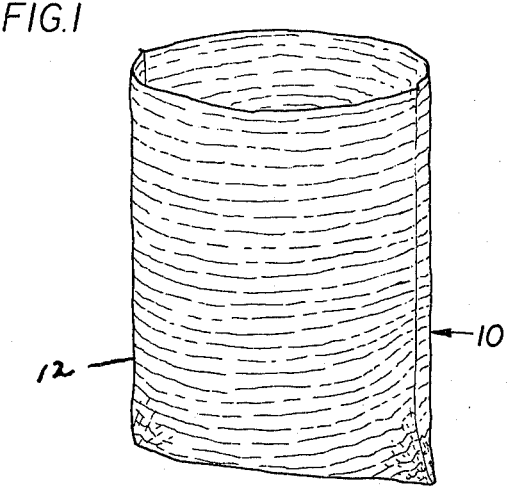
FIG. 1 is a perspective view of a bag have ribs extending transversely.
Figure 2:
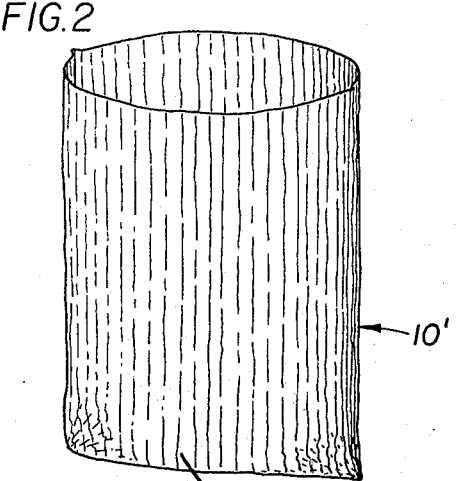
FIG. 2 is a perspective view of a bag with ribs extending longitudinally.
Figure 3:
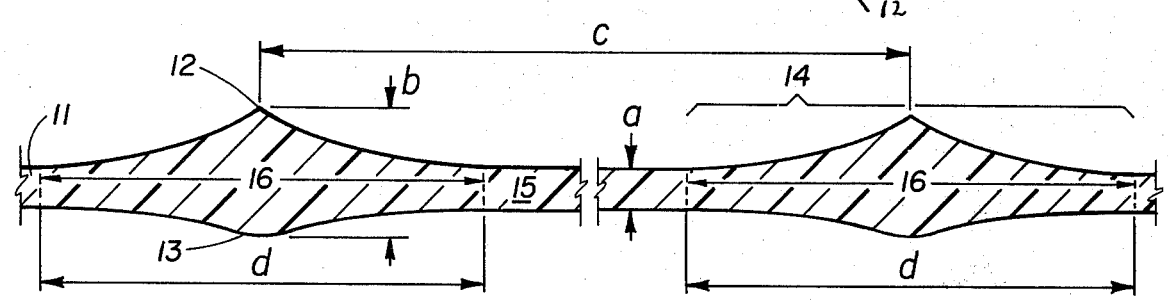
FIG. 3 is a transverse cross-sectional view through the material from which the bags of FIGS. 1 and 2 are made, illustrating the ribs, and dimensions important in connection therewith.

The bag 10 of FIG. 1 is conventional and is made of ribbed sheet material, seen in cross section in FIG. 3. The ribs 12 extend transversely of the bag. The construction may be gusseted, or flat, made of a tube having a seam at the bottom, two seams at the side, or as desired. FIG. 2 illustrates a bag which in all respects is similar to that of FIG. 1, except that the sheet material is laid in the other direction, with the ribs 12 extending vertically of the bag.

The ribbed material itself is best seen in FIG. 3. A web 11 is extruded in an extrusion apparatus, as well known (see, for examle, the above referred to U.S. Pat. No. 2,750,631), and expanded by an enclosed air bubble. The web 11 has ridges 12 formed thereon. Due to the differential cooling of the material, at the different thicknesses thereof, a short counter rib 13 will form at the other side of the web, as clearly seen in FIG. 3. The rib 12 is peaked, and tapering to a point as shown in FIG. 3, and has sloping sides 14, which merge smoothly with the zone 15 between the ribs 12 of the web material 11. In a preferred form, the dimensions for the thickness of the web 11 between the ribs, that is, the nominal thickness of the web 11, and particularly in the zones 15, as indicated by dimension is about 0.02 to 0.05 mm, preferably 0.035 mm (1.35 mils). Dimension b, the overall thickness of the ribs 12, and 13, is about 0.09 mm (3.5 mils). The dimension c, that is, the spacing from peak-to-peak between the ribs may vary widely, for example about ¼ cm to 2 cm; a range closer to the lower end is preferred, for example about ½ to 1 cm. The dimension d, which covers a zone 16, that is, the lateral extent of the thickening formed by the ribs, and which determine the slope of the ribs as they merge smoothly into zone 15 should be so selected that the merger is gradual, to provide a defined, peaked rib, with smooth transition to the web of the thickness of zone 15. This dimension d, for a rib of thickness 0.09 mm and a web of thickness 0.035 mm would be about 0.6 mm (25 mils). A web of such dimensions will have the same mass (weight) as a smooth web having an average wall thickness of about 0.04 mm (1.5 mils). The overall extent of the thickness of the ribs (dimension b) should be in the order of about 1.5 to 4 times the wall thickness of the film, measured, for example, in zone 15 (dimension a), and the widths of the rib, throughout the region where it is thickened, and assuming a smooth merging from a peak to the thickness of the web itself (dimension d) should be about 4 to 10 times the thickness of the ribs (b). These ranges are given as preferred dimensions, in which the advantages of the ribs are best obtained when the material is formed into a bag.

Figure 4:
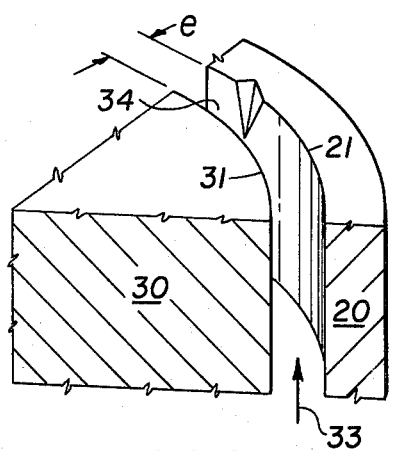
FIG. 4 is a perspective view, highly enlarged, of a section of the extrusion gap between an extrusion die and mandrel, and showing a notch which will form ribs on the extrusion.
Figure 5:
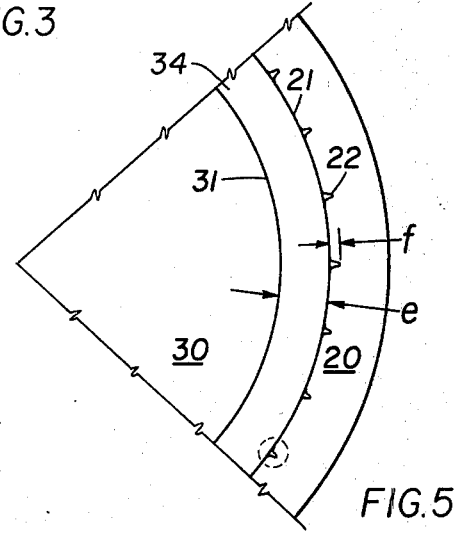
FIG. 5 is a top view, to reduce scale, showing the arrangement of the notches around the circumference of the die.
Figure 6:
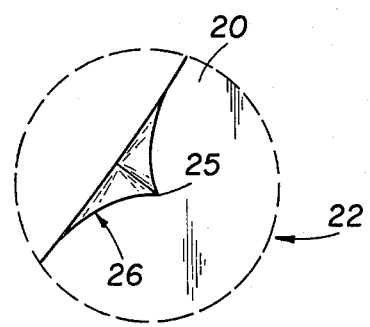
FIG. 6 is a highly enlarged view of the notch, circled in dashed lines in FIG. 5, showing the appearance of a notch, in schematic top view representation.

The web 11 is made on a standard extrusion machine, for example as illustrated in the aforementioned patent and as well known in the industry. Referring to FIGS. 4 to 6, the well known machine is modified by forming the extrusion gap 34 with notches 22. An outer, annular die 20 has an inner annular extrusion surface 21. A mandrel 30, with an outer circumferential extrusion surface 31 is located concentrically to die 20. The extrusion gap 34 is formed between the die and mandrel. Either the die or the mandrel, preferably the die 20, has notches 22 cut in the surface defining the extrusion gap, that is, at the edge 21. These notches 22 are spaced uniformly, circumferentially around the die 20, as seen partially in FIG. 5. The notches 22 have a peaked inner end 25 (FIG. 6), and rounded edges 26, merging smoothly into edge 21 defining the extrusion gap, and also likewise merging smoothly with the inner surface of the annular die 20. The notches therefore are pre-shaped to form the smoothly merging sides 14 (FIG. 3) of the zones 16 of the web 11.

The width of the extrusion gap, dimension e (FIG. 4) may vary widely, for example in the range of from 0.1 to 1.5 mm. The depths of the notches 22, dimension f is in the order of 1.2 times the width of gap 34.

In operation, flowable resin is introduced in direction of arrow 33 to be extruded through the extrusion gap, or die orifice 34. The resulting tube is inflated, by including an air bubble in the material of the extruded tube, closed off by a pair of pull-off rollers (as well known in the art), the air bubble included within the tube stretching the resin to form a sheet of the desired wall thickness, that is, dimension a, in FIG. 3. The wall thickness is determined by the extrusion speed, the pressure in the air bubble, and the like, as well as by the width e of the extrusion gap. The reduction in thickness of the extruded tubular material, that is, of the web portion thereof, hardly affects the additional thickness applied where the notches 22 are located, and the depths f of the notches is much less than the ratio of the widths e of the die orifice gap 34 to the final thickness a of the web 11. Thus, during blowing, the wall thickness (dimension a) becomes much less than the gap widths 34 (dimension e), than the change in dimension from notch depths (dimension f) to the overall thickness of the ribs 12 (dimension b). As the tube is drawn away from the extrusion die usually upwardly, the expanding, still soft polyethylene cools; at the zones where the material is thickened, however, due to the additional material being applied through the notches 22, cooling will be somewhat delayed and the counter ridges 13 will be formed. The web zone 15 will cool first, and then cooling will progress uniformly through the zone 16 until the ridges 12 are also cooled, with smooth transition of hardening between the ribs 12 and the zone 15. The shaping of the transition zone 26 of the notches, as well as the operating condition of the blown film extruder should be so set that the dimension d (FIG. 3) falls in the range of about 0.5 to 1.5 mm, with a preferred value being towards the lower end of the range.

The blow-up ratio can be set somewhat higher than that used for unribbed film, resulting in improved toughness of the film, that is, resistance towards tearing both in a direction parallel to the direction of extrusion (also called "machine direction" as well transversely thereof ("transverse direction"). If the blow-up ratio for unribbed film would be selected to be about 2.2:1 to 2.4:1, then a suitable blow-up ratio for ribbed film would be in the order of about 2.5:1 to 3:1. Increasing the blow-up ratio somewhat, but only slightly decreases the puncture resistance, but increases the average toughness of the film, and resistance to progression of such punctures, or small tears which may arise.

The material of which the bags are made is generally referred to in ASTM Standard B 1248-68, "Standard specification for polyethylene plastics molding and extrusion material." With respect to density, the type 1 material is suitable; with respect to melt index, material of categories 3, 4, 5 are suitable.

The depths of the notch (dimension f) varies with the size of the orifice gap, dimension e. For a rib being about three times as thick as the average wall thickness (dimension a), a typical die orifice would be 0.6 mm. The width of the notch 22, circumferentially, can then be about 0.75 mm, and its depth (dimension f) also about 0.75 mm. If the size of the orifice is increased to, say, 0.9 mm, then notch, width and depth of about 1 mm are suitable. It appears that the relative relationship of the width of the gap 34 and of the size of the notch varies approximately linearly with the change in gap width. The ratio is about 5:6. The blow-up ratio, as referred to in the specification may be defined as the ratio of the circumference of the bubble of the blown tube to the circumference of the die. For further discussion of the process and the technology involved, reference may be had to Plastics Extrusion Technology, by A. L. Griff, Reinhold Pub. Co., 1962, particularly Chapter 5 "Film Extrusion."

FIGS. 7, 8 and 9 are illustrative of specific bag structures which may be fabricated from the ribbed film structure of the present invention. In FIG. 7 there is shown a continuous roll of bags fabricated from thermoplastic material having the aforedescribed rib structure. Each individual bag structure is formed with a transverse seal area 45 having perforations 46, formed in the heat seal area 45, whereby individual bags may be removed from the roll by tearing along seal area 45 which has been weakened by perforations 46. The individual bag structures as shown in FIGS. 7 and 8 comprise a front wall 47 and a rear wall 48. As shown in FIGS. 7 and 8 front wall 47 extends up and beyond the upper edge of rear wall 48, whereby a lip 43 is formed. Although lip 43 may be desirable in some packaging applications as hereinafter described, it should be noted that a bag structure wherein no lip 43 is present, i.e. where the upper edges of rear wall 48 and front wall 47 coincide are also within the scope of the present invention.

The ribs which extend transversely across the individual bag structure shown in FIG. 8 are spaced in a specific embodiment, on 3/16 inch centers and have a total height or thickness of about 3.5 mile. The thickness of the film intermediate adjacent ribs is about 0.6 mil.

As shown in FIG. 7 and 8, a specific bag structure, which may be formed from the ribbed material of the present invention, is characterized by having a heat seal defining the bag edges, the bag bottom comprising a fold line. When it is desired to separate an individual bag from a roll of bags 41, the bags are easily separated by tearing along seal area 45 causing rupturing of the central portion of seal area 45 by virtue of the perforations 46 within the seal line area.

There is shown in FIG. 9 a roll of bags, the individual bags being similar to those shown in FIG. 8. Individual bags on the roll being separated by two spaced apart, transverse heat seals 50 and having a line of weakness 51, i.e. perforations, extending transversely across the web intermediate the transverse seals. In this instance, individual bags are separated from the bag roll by tearing through the perforate line to yield a single bag. A skirt of material is left between the perforated line and the transverse heat seal as individual bags are torn from the bag roll.

When it is desired to close the individual bag structures of the present invention, lip 43, a continuous extension of front wall 47 is folded down within the aperture intermediate locking flap 44. Subsequently locking flap 44 is inverted by insertion of the index fingers of both hands up under the flap into the top corners of the inverted pocket. Next by placing the thumbs against the top corners outside the flap, against the tips of the forefingers and with a twist of the wrists flips the flap over the top or mouth of the container body thereby forming a closure.

When it is desired to open the mouth of the container, locking flap 44 may readily be flipped rearwardly into its normal open position against the rear wall of the container body. It is noted herein that U.S. Pat. No. 2,709,467 discloses a similar locking arrangement.

Various changes and modifications may be made within the inventive concept and while the limit set forth herein are not critical, they are given as a general guidance for preferred values when making disposable bags, for example as trash can liners, grass bags, sandwich bags, and the like.

Suitable commonly used liner grade low density polyethylene for use in the present invention is described in ASTM specification D-1248-68.

Although the present invention has been described with preferred embodiments, it is to be understood that modifications and variations may be restored to, without departing from the spirit and scope of this invention, as those skilled in the art will readily understand. Such variations and modifications are considered to be within the purview and scope of the appended claims.

We claim:

1. Directionally reinforced thin wall plastic bag comprising:
a film of low density polyethylene material having a wall thickness on the order of about 0.4 to about 2.0 mils with spaced peaked ribs (12, 13, 16) integral with the film and formed in the film, said ribs having a rib-to-rib spacing (c) on the order of about ⅛ cm to 2 cm; said ribs being characterized by having an overall thickness (b) on the order of between 1.5 to 10 times the wall thickness of said film, said ribs having gradually sloped sides which merge smoothly from a projecting peak, said peak tapering to a point, to the thickness (a) of the walls (15) between the ribs.

2. Bag according to claim 1 wherein the ribs extend from both sides of the wall of the film.

3. Bag according to claim 1 wherein the ribs extending from one side of the film extend for a distance greater than the ribs extending from the other side of the film.

4. Bag according to claim 2 wherein the overall extent (b) of the ribs is in the order of 0.1 mm.

5. Bag according to claim 1 wherein the ribs extend from both sides of the walls of the film, the projection of the ribs at one side being about ¼ of the total projection, the projection of the ribs from the other side being about ¾ of the total projection.

6. Bag according to claim 1 wherein the film is a hardened extrusion of plasticized polyethylene with thicker ribs extruded with said film when the polyethylene is in plasticized condition, the thickened ribs being formed by additional material integral with the film, and added to one side of the plane of the film, gradual hardening of the material of the ribs and the material of the walls (15) between the ribs forming a smooth transition zone (14, 16) between the ribs and the walls of the film (15).

7. Bag according to claim 1 wherein the ribs have a vectorial direction in the direction of orientation of the internal structure of the polyethylene determined by the extrusion of the material.

8. Bag according to claim 1 wherein the spacing (c) between the peaks of the ribs is in the order of ½–1 cm.

9. Bag according to claim 2 wherein the spacing (c) between the peaks of the ribs is in the order of ½–1 cm.

10. Bag according to claim 1 wherein the zone (16) of material of greater thickness than that of the walls (15) between the ribs, and smoothly merging towards the peak of the ribs is in the order of ½–¾ mm.

11. Bag according to claim 8 wherein the overall extent (b) of the ribs is in the order of between 1.5 to ten times the wall thickness (a) of the film and the spacing (c) between the peaks of the ribs is in the order of ½ to 1 cm.

12. Thermoplastic bags, formed from the ribbed film material in accordance with claim 1, said bags comprising a front wall and a back wall joined together along their superposed edges, said front wall having an upper edge which extends above the upper edge of said back wall, the upper edge of said back wall being folded back and heat sealed to the opposite edges of the upper portion of rear wall.

* * * * *